United States Patent [19]

Vasta

[11] Patent Number: 4,503,174

[45] Date of Patent: Mar. 5, 1985

[54] LOW TEMPERATURE CURING COATING COMPOSITION

[75] Inventor: Joseph A. Vasta, Wilmington, Del.

[73] Assignee: E. I. Du Pont de Nemours and Company, Wilmington, Del.

[21] Appl. No.: 529,621

[22] Filed: Sep. 6, 1983

[51] Int. Cl.[3] .................... C08K 5/54; C08L 63/00
[52] U.S. Cl. ................................ 523/439; 523/461;
523/467; 525/113; 525/117; 525/119; 525/939
[58] Field of Search .............. 523/439, 461, 467;
525/113, 117, 119, 939

[56] References Cited

U.S. PATENT DOCUMENTS

| | | | |
|---|---|---|---|
| 2,795,564 | 6/1957 | Conn et al. | 260/29.6 |
| 2,798,861 | 7/1957 | Segall et al. | 260/45.5 |
| 2,842,459 | 7/1958 | Gollub et al. | 117/72 |
| 2,954,358 | 9/1960 | Hurwitz | 260/29.6 |
| 3,011,909 | 12/1961 | Hart et al. | 117/72 |
| 3,070,564 | 12/1962 | Roeser | 260/33.6 |
| 3,107,226 | 10/1963 | Tonner et al. | 260/23 |
| 3,154,598 | 10/1964 | Vasta | 260/837 |
| 3,196,120 | 7/1965 | McLaughlin et al. | 260/23 |
| 3,215,757 | 11/1965 | Schelbli et al. | 260/837 |
| 3,245,925 | 4/1966 | Watson | 260/20 |
| 3,248,356 | 4/1966 | Snyder | 260/29.6 |
| 3,301,801 | 1/1967 | Gaske et al. | 260/17 |
| 3,305,601 | 2/1967 | Hicks | 260/837 |
| 3,375,227 | 3/1968 | Hicks | 260/47 |
| 3,492,252 | 1/1970 | Euchner et al. | 260/8 |
| 3,509,086 | 4/1970 | Rohrbacher | 260/32.8 |
| 3,532,653 | 10/1970 | Smeal | 523/467 |
| 3,544,495 | 12/1970 | Nazy et al. | 260/18 |
| 3,558,564 | 1/1971 | Vasta | 524/507 |
| 3,647,765 | 3/1972 | Mortillaro et al. | 260/78 UA |
| 3,679,642 | 7/1972 | Vasta | 523/439 |
| 3,758,633 | 9/1973 | Labana et al. | 260/836 |
| 3,776,865 | 12/1973 | Glaser et al. | 260/18 N |
| 3,846,368 | 11/1974 | Pettit | 523/439 |
| 3,945,963 | 3/1976 | Levine et al. | 260/29.6 NR |
| 3,954,898 | 5/1976 | Hirota et al. | 525/113 |
| 3,960,979 | 6/1976 | Khanna | 260/834 |
| 3,979,540 | 9/1976 | Moffett | 428/414 |
| 4,018,848 | 4/1977 | Khanna | 260/834 |
| 4,032,479 | 6/1977 | Bunnomori et al. | 525/419 |
| 4,069,174 | 1/1978 | Nakata et al. | 524/417 |
| 4,122,128 | 10/1978 | Lehmann et al. | 525/113 |
| 4,177,178 | 12/1979 | Das et al. | 260/29.40 A |
| 4,181,645 | 1/1980 | Kinoshita | 525/113 |
| 4,192,929 | 3/1980 | Wingfield | 525/110 |
| 4,383,059 | 5/1983 | Brook et al. | 523/412 |

FOREIGN PATENT DOCUMENTS 2064916  8/1971  Fed. Rep. of Germany ...... 525/113

OTHER PUBLICATIONS

Chem. Abs., 96-53249(b)-1982, JP81131620.
Chem. Abs., 99-23548(t)-1983, JP57210647.
Chem. Abs., 90-56126, 1979, J78112950.
Chem. Abs., 92-77490s, 1980, JP79127458.
Chem. Abs., 92-190208(u)-1980, 80JP05929, Pub. Jan. 17, 1980.
Chem. Abs., 94-5037(t)-1981, Pub. Jul. 26, 1980, J80-98262.

Primary Examiner—Herbert J. Lilling
Attorney, Agent, or Firm—Hilmar L. Fricke

[57] ABSTRACT

A low temperature curing coating composition containing 10–80% by weight of binder and 20–90% by weight of an organic solvent in which the binder is (1) an acrylic polymer containing monomers having reactive groups such as acrylamide, methacrylamide, methacrylic acid, acrylic acid and glycidyl methacrylate,
(2) an epoxy resin,
(3) a polyamine curing agent,
(4) phenol and
(5) a bicyclic amindine;

The composition is used as a primer or topcoating for metal substrates and curings at temperatures of 0° C. to ambient temperatures and provides a primer that has excellent adhesion to the substrate and provides a durable, corrosion resistant finish.

17 Claims, No Drawings

LOW TEMPERATURE CURING COATING COMPOSITION

BACKGROUND OF THE INVENTION

This invention is related to a coating composition and in particular to a coating composition that cures at low temperatures.

In northern climates, the season for painting the exterior surfaces of structure such as oil well platforms, bridges, oil or chemical storage tanks, ships and barges is very short. Currently, coating compositions that cure at ambient temperatures of 10° C. and above are used. One such composition is shown in Vasta U.S. Pat. No. 3,558,564 issued Jan. 26, 1971. A coating composition is needed that will cure at temperatures as low as 0° C. which would increase the painting season by several months in northern climates. Such a composition should have the following characteristics: excellent adhesion to the substrate, corrosion resistance, solvent resistance, weather resistance and in general provide excellent durability. Also, the composition should provide a surface to which other coatings can be applied and will adhere.

The novel composition has the aforementioned characteristics.

SUMMARY OF THE INVENTION

A low temperature curing coating composition containing 10–80% by weight of binder and 20–90% by weight of an organic solvent; wherein the binder is
(1) an acrylic polymer containing 0.1–10% by weight of polymerized monomers having reactive groups selected from the following group: acrylamide, methacrylamide, methacrylic acid, acrylic acid and glycidyl methacrylate,
(2) an epoxy resin or an epoxy novolac resin,
(3) a polyamine curing agent,
(4) phenol and
(5) a bicyclic amidine.

DETAILED DESCRIPTION OF THE INVENTION

The coating composition contains about 10–80% by weight organic solvent. By selecting binder constituents with a relatively low molecular weight, high solids compositions can be formulated having a binder solids content of 50–80% by weight. The binder is a blend of an acrylic polymer, an epoxy resin or epoxy novolac resin, a polyamine curing agent, phenol and a bicyclic amidine. Usually, the composition contains pigments in a pigment to binder weight ratio of about 20:100 to 200:100.

One particular advantage of the composition is that it fully cures at temperatures as low as 0° C. in about 24 hours. Curing is substantially faster at temperatures above 0° C. Under normal temperature conditions "pot life" of the composition is at least several hours which is adequate to apply the composition.

The acrylic polymer used in the composition contains about 0.1–10% by weight, based on the weight of the polymer, of polymerized monomers having reactive groups such as acrylamide, methacrylamide, methacrylic acid, acrylic acid or glycidyl methacrylate. Other monomers used to form the acrylic polymer are alkyl methacrylates having 1–12 carbon atoms in the alkyl group such as methyl methacrylate, ethyl methacrylate, propyl methacrylate, isopropyl methacrylate, butyl methacrylate, isobutyl methacrylate, pentyl methacrylate, hexyl methacrylate, ethyl hexyl methacrylate, nonyl methacrylate, decyl methacrylate, lauryl methacrylate and the like. Alkyl acrylates can also be used having 1–12 carbon atoms in the alkyl group such as methyl acrylate, ethyl acrylate, propyl acrylate, butyl acrylate, isobutyl acrylate, pentyl acrylate, hexyl acrylate, ethyl hexyl acrylate, nonyl acrylate, decyl acrylate, lauryl acrylate and the like.

In addition to the aforementioned monomers, the following monomers can be used to form the acrylic polymer: styrene, vinyl toluene, vinyoxazoline esters, maleate esters such as diethyl maleate, fumurate esters such as dimethyl fumurate.

The weight average molecular weight of the acrylic is about 5,000–75,000. Molecular weights of 40,000 60,000 are preferred.

Molecular weight as used herein are determined by gel permeation chromatography using polymethyl methacrylate as the standard.

The monomer constituents of the acrylic polymer are chosen to provide for a desired glass transition temperature and desired flexibility of the finish formed from the coating composition. The reactive monomer is chosen to be reactive with other constituents in the composition. The polymer is prepared by procedures well known in the art which the acrylic monomers are charged into a polymerization vessel at precalculated rates to form the desired polymer with solvents and polymerization catalyst such as an azopolymerization catalyst as azobisisobutyronitrile or a peroxy polymerization catalyst such as benzoyl peroxide. Polymerization temperatures used are 75°–250° C. for about 0.5–6 hours.

Preferred acrylic polymers are as follows: methyl methacrylate, alkyl methacrylate or alkyl acrylate each having 2–8 carbon atoms in the alkyl group and methacrylic acid having a weight average molecular weight of 5,000–75,000;

methyl methacrylate, butyl methacrylate, methacrylic acid having a molecular weight of about 40,000–60,000;

50–69.9% by weight, based on the weight of the acrylic polymer, of methyl methacrylate, 30–47% by weight, based on the weight of the acrylic polymer, of butyl methacrylate, 0.1–3% by weight, based on the weight of the acrylic polymer of methacrylic acid.

An epoxy resin that can be used in the composition has the formula

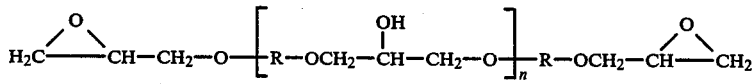

where n is a positive integer of about 0.5 to 4. Preferably, the epoxy resin is the polymerization product of epichlorohydrin and bisphenol A. With this preferred epoxy resin, R in the above formula is

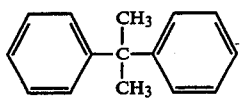

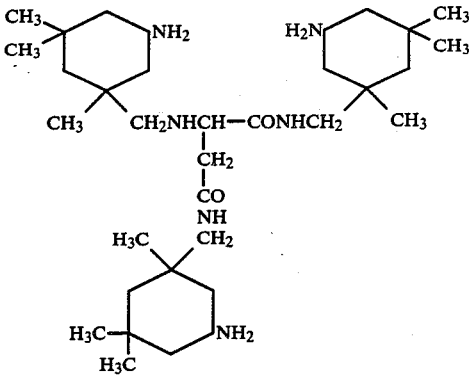

Typical of these preferred epoxy resins are "Epon" 828 having an equivalent weight of about 185–192 manufactured by Shell Chemical Company and DER 331 having an equivalent weight of about 182–190 manufactured by The Dow Chemical Company. The equivalent weight is the grams of resin that contain one gram equivalent of epoxide.

An epoxy novolac resin that can be used in the composition has the formula

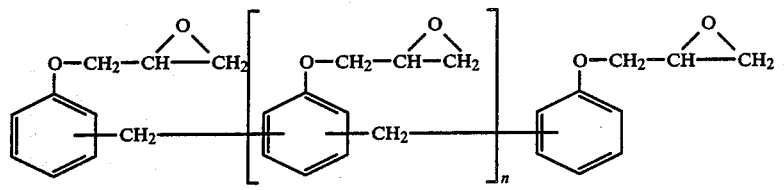

where n is a positive integer of about 0.2–2. Preferred epoxy novolac resins are DEN 431 where n has an average value of 0.2, DEN 438 where n has an average value of 1.6 and DEN 439 where n has an average value of 1.8. These resins are manufactured by the Dow Chemical Company.

The coating composition contains an amine curing agent of the formula

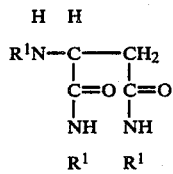

where $R^1$ is $R_2NH_2$ and $R_2$ is an aliphatic or cycloaliphatic hydrocarbon radical The curing agent is prepared by reacting 3 moles of an aliphatic or cycloaliphatic polyamine with 1 mole of a dialkyl maleate. Reaction temperatures of about 100°–150° C. are used for about 1–6 hours to form the curing agent while an alkanol resulting from the reaction is removed.

Typical polyamines used to form the curing agent are isophorone diamine which is 3-aminoethyl-3,5,5-trimethyl cyclohexylamine, hexamethylene diamines, ethylene diamine, 1,4-cyclohexane bis(methylamine), 1,2 diaminopropane, propylene diamine, diethyl ether diamine and trimethyl hexamethyl methylene diamine. Typical dialkyl maleates are dimethyl maleate, diethyl maleate, ethyl methyl maleate, dipropyl maleate, dibutyl maleate and the like.

One preferred curing agent is the reaction product of isophorone diamine and dimethyl maleate and has the following structural formula:

Another group of curing agents can be used to provide relatively soft and elastomeric coatings. These curing agents are prepared by a Michael's reaction in which a multifunctional acrylate or methacrylate is reacted with a polyamine. The polyamine is heated to about 100°–150° C. and then the multifunctional acrylate or methacrylate is reacted with the polyamine for a 1–6 hour period to form an amine terminated curing agent.

Typical multifunctional acrylates or methacrylates that can be used to form the curing agent are trimethylol propane acrylate, trimethylol propane methacrylate, pentaerythritol acrylate, pentaerythritol methacrylate and the like. Any of the aforementioned polyamines can be used for forming the curing agent.

To decrease curing time and increase toughness of finishes of the composition phenol and a bicyclic amidine are used in the composition. One preferred bicyclic amidine is 1,8-diaza-bicyclo(5,4,0)-undecene-7.

Preferably, the binder of the coating composition consists essentially of 20–60% by weight of the acrylic polymer, 15–45% by weight of epoxy resin or epoxy novolac resin, 10–25% by weight of the polyamine curing agent, 1–7% by weight of phenol and 0.01–3% by weight of bicyclic amidine.

About 0.5–5% by weight, based on the weight of the binder, of a chloride ion scavenger can be added to the composition. The metal ion of the scavenger reacts with any residual chlorides which may be on a substrate being painted thereby reducing corrosion of the substrate. For example, the steel on oil well platforms in the ocean is covered with a salt residue. If the salt on the surface of the steel is not bound in some manner, corrosion starts and rapidly accelerates.

Typical chloride ion scavengers that can be used are as follows: lead naphthenate which is preferred lead tallate and lead octate.

Often the composition is applied over substrates that are moist or wet. To insure thorough wetting of the surface and penetration to the metal about 0.1–3% by weight, based on the weight of the binder, of a silicone wetting agent is added to the composition. Typical silicone wetting agents are as follows: oxyethylene methyl siloxanes such as "Silwet" L-77 and "Silwet" L-7607 made by Union Carbide and other condensation products of ethylene oxide and alkyl siloxane.

Generally, the composition is pigmented. The pigments are dispersed in the composition by conventional techniques such as ball milling, sand grinding, attritor grinding and the like. Typical pigments that can be used are as follows: metallic oxides such as titanium dioxide, iron oxide, zinc oxide, chromate pigments such as lead chromate, filler pigments such as barytes, talc, china clay and the like, phosphate pigments such as zinc phosphate, carbon black, black molybdate oxide pigments, barium metaborate pigments and the like.

One particularly useful combination of pigments for a corrosion resistant primer is the following: titanium dioxide, barytes, talc, carbon black and zinc phosphate.

The composition generally is in two components. Component A contains the acrylic polymer and epoxy resin and pigments. Component B contains the polyamine curing agent, phenol, and bicyclic amidine. The two components are blended together a relatively short time before application. Pot life of the composition at temperature of 0° C. is at least one week and at 25° C. is about 24 hours.

Solvents used in the composition are chosen to provide curing at low temperatures and have a high evaporation rate at these low temperatures. Typically useful solvents are as follows: alcohols such as methanol, ethanol, propanol isopropanol, benzyl alcohol, acetates such as ethyl acetate, toluene, xylene, and the like.

The coating composition can be applied by conventional methods such as spraying, electrostatic spraying, brushing, dipping, flow coating and the like. The composition can be applied to a variety of substrates such as steel, iron, painted steel, treated steel such as phosphatized steel, aluminum, plastics, wood glass and the like. The composition can be fully cured as demonstrated by resistance to solvents such as methyl ethyl ketone at about 0° C. in about 24 to 48 hours. Higher curing temperatures reduce curing time. The resulting finish has excellent adhesion to the substrate, good corrosion resistance, is weatherable and durable and with proper pigmentation can be used as a primer or as a topcoat. The composition is particularly useful as an overcoat primer for steel substrates coated with an inorganic zinc primer.

The composition is particularly useful in cold climates to paint oil well platforms in the ocean, oil rigs on land, ships, barges, oil and chemical tanks, bridges, oil refineries and the like.

The following example illustrates the invention. All parts and percentages are on a weight basis unless otherwise indicated. Molecular weights are determined by gel permeation chromatography using polymethyl methacrylate as a standard.

EXAMPLE

A coating composition was prepared by forming Composition A and Composition B and then mixing Compositions A and B together.

Composition A was prepared by charging the following constituents into a pebble mill and grinding for about 36 hours and then removing and filtering the resulting composition.

|  | Parts by Weight |
|---|---|
| Acrylic polymer resin solution (40% solids in a 50/50 solvent blend of toluene and ethyl acetate of a polymer of methyl methacrylate/butyl methacrylate/methacrylic acid, weight ratio 60/40/0.5, having a number average molecular weight of 14,000 and a weight average molecular weight of 50,000) | 348.42 |
| "Epon" 828 epoxy resin (liquid epoxy resin of Bisphenol A and epichlorohydrin having an epoxide equivalent weight of 185–192 and a viscosity measured at 25° C. of 11,000–15,000) | 93.09 |
| Ethyl acetate | 122.48 |
| Toluene | 84.07 |
| Titanium dioxide pigment | 110.74 |
| Barytes pigment | 86.62 |
| Talc pigment | 110.74 |
| Zinc phosphate pigment | 132.64 |
| Carbon black powder | 2.20 |
| Total | 1091.00 |
| Composition B |  |
| Polyamine curing agent (55% solids in isopropanol of the reaction product of 3 moles of isophorone diamine and 1 mole dimethyl maleate) | 475.80 |
| Isopropanol | 183.00 |
| Benzyl alcohol | 14.64 |
| Phenol | 43.92 |
| Bicyclic amidine (1,8 diazabicyclo5,4,0)-undecene-7) | 14.94 |
| Total | 732.30 |

The above constituents were charged into a mixing vessel and thoroughly mixed together.

A primer was prepared by blending 1000 parts of Composition A with 100 parts of Composition B and the resulting primer was reduced with toluene to a spray viscosity of 25 seconds measured with a #2 Zahn cup. The primer was sprayed onto grit blasted steel panels and steel panels coated with an inorganic zinc composition. The panels were cured at 0° C. for about 48 hours. The resulting primer coat was fully cured and was about 125 microns thick. The panels were then coated with a polyurethane coating composition described in Vasta U.S. Pat. No. 3,558,564 which provided a durable weatherable corrosion resistant coating.

The above primer was sprayed onto grit blasted steel panels and cured at about 0° C. The resulting primer was fully cured in about 48 hours.

I claim:

1. A coating composition comprising 10–80% by weight of binder and 20–90% by weight of an organic solvent; wherein the binder consists essentially of
   (1) an acrylic polymer containing 0.1–10% by weight of polymerized monomers having reactive groups selected from the group consisting of acrylamide, methacrylamide, methacrylic acid, acrylic acid and glycidyl methacrylate,
   (2) an epoxy resin,
   (3) a polyamine curing agent of the formula

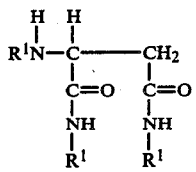

where $R^1$ is $R^2NH_2$ and $R^2$ is an aliphatic or cycloaliphatic radical (4) phenol and
(5) a bicyclic amidine.

2. The coating composition of claim 1 containing pigment in a pigment to binder weight ratio of about 20:100 to 200:100.

3. The coating composition of claim 2 in which the acrylic polymer comprises methyl methacrylate, alkyl methacrylate or an alkyl acrylate each having 2–8 carbon atoms in the alkyl group and methacrylic acid and having a weight average molecular weight of about 5,000–75,000.

4. The coating composition of claim 3 in which the acrylic polymer consists essentially of methyl methacrylate, butyl methacrylate, methacrylic acid and has a molecular weight of about 40,000–60,000.

5. The coating composition of claim 3 in which the epoxy resin has the formula

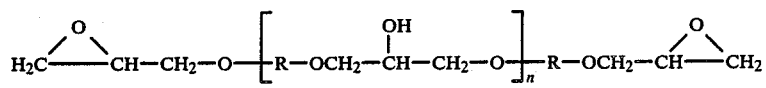

where R is an aromatic radical and n is a positive integer of about 0.5 to 4.

6. The coating composition of claim 5 in which R is

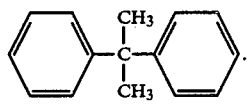

7. The coating composition of claim 3 in which the epoxy resin is an epoxy novolac resin of the formula

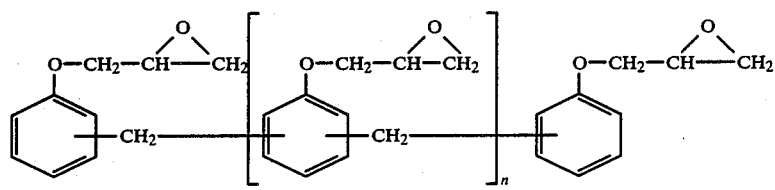

where n is a positive integer of about 0.2–2.

8. The coating composition of claim 2 in which $R^1$ is

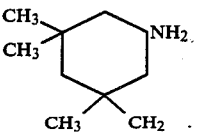

9. The coating composition of claim 2 in which the bicyclic amidine is 1,8-diaza-bicyclo[5,4,0]-undecene-7.

10. The coating composition of claim 2 containing about 0.5–5% by weight, based on the weight of the binder, of a chloride scavanger.

11. The coating composition of claim 10 in which the chloride scavanger is lead naphthenate.

12. The coating composition of claim 2 containing about 0.1–3% by weight, based on the weight of the binder, of a silicone wetting agent.

13. The coating composition of claim 12 in which the silicone wetting agent is oxyethylene methyl siloxane.

14. The coating composition of claim 2 in which the binder consists essentially of about the binder consists essentially of about 20–60% by weight of acrylic polymer, 15–45% by weight of epoxy resin 10–25% by weight of polyamine curing agent, 1–7% by weight of phenol and 0.01–3% by weight of bicyclic amidine.

15. The coating composition of claim 1 in which the binder consists essentially of about (1) 20–60% by weight, based on the weight of the binder, of an acrylic polymer consisting essentially of 50–69.9% by weight, based on the weight of the acrylic polymer, of methyl methacrylate, 30–47% by weight, based on the weight of the acrylic polymer, of butyl methacrylate, 0.1–3% by weight, based on the weight of the acrylic polymer, of methacrylic acid, wherein the acrylic polymer has a weight average molecular weight of about 40,000–60,000;

(2) 15–45% by weight, based on the weight of the binder, of an epoxy resin of the formula

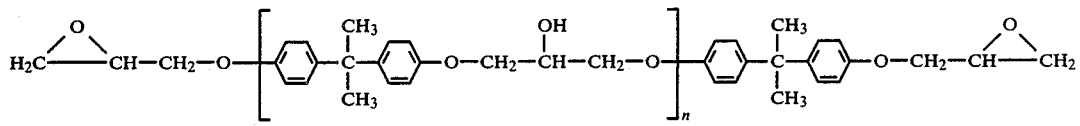

where n is a positive integer of about 0.5 to 4;

(3) 10–25% by weight, based on the weight of the binder, of a polyamine curing agent of the formula

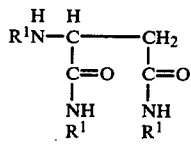

where R1 is

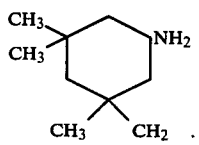

(4) 1-7% by weight, based on the weight of the binder, of phenol, and (5) 0.01-3% by weight of 1,8-diaza-bicyclo(5,4,0)-undecene 7 and containing pigment in a pigment to binder weight ratio of about 20:100 to 200:100.

16. The coating composition of claim 15 containing about 0.5-5% by weight, based on the weight of the binder, of lead naphthenate and 0.1-3% by weight, based on the weight of the binder, of a silicone wetting agent of oxyethylene methyl siloxane.

17. A two-component composition, wherein the two components are mixed together to form a composition comprising about 10-80% by weight binder and 20-90% by weight organic solvent and wherein the components comprise component (1) a solution of an acrylic polymer containing 0.1-10% by weight of polymerized monomers having reactive groups selected from the group consisting of acrylamide, methacrylamide, methacrylic acid, acrylic acid and glycidyl methacrylate, and an epoxy resin, component (2) a polyamine curing agent, phenol and a bicyclic amidine.

* * * * *